United States Patent [19]

Simmons

[11] Patent Number: 5,219,394

[45] Date of Patent: Jun. 15, 1993

[54] APPLIANCE FOR BREWING BEVERAGES

[75] Inventor: Sean Simmons, Sea Cliff, N.Y.

[73] Assignee: The Singer Company N.V., Curacao, Netherlands

[21] Appl. No.: 799,660

[22] Filed: Nov. 29, 1991

[51] Int. Cl.$^5$ ............................................. A47J 31/00
[52] U.S. Cl. ...................................... 99/299; 99/307; 99/316
[58] Field of Search ............ 99/279, 280, 281, 289 R, 99/295, 296, 298, 300, 304, 306, 307, 311, 316, 302 R, 299; 222/510, 518

[56] References Cited

U.S. PATENT DOCUMENTS

| | | | |
|---|---|---|---|
| 4,155,292 | 5/1979 | Rickert | 99/306 |
| 4,159,788 | 7/1979 | Doyel | 222/510 |
| 4,309,940 | 1/1982 | Lowerre, Jr. | 99/316 |
| 4,614,859 | 9/1986 | Beckering et al. | 99/281 |
| 4,674,400 | 6/1987 | Rondel et al. | 99/279 |
| 4,704,954 | 11/1987 | Mollenhoff | 99/279 |
| 4,882,983 | 11/1989 | Pastrick | 99/295 |
| 5,063,838 | 11/1991 | Matuschek | 99/307 |

Primary Examiner—Harvey C. Hornsby
Assistant Examiner—Reginald L. Alexander

[57] ABSTRACT

A vertical hollow cylinder has a first vertical hollow tube on its periphery which extends upwardly above the upper cylinder end and terminates in a hollow horizontal extension having a downwardly disposed discharge orifice overlying the open cylinder end. A vertical hollow cylindrical member has an upper end being disposed adjacent but below the horizontal tube extension and lower end adjacent but below the upper cylinder. The member is peripherally secured to the first tube and being horizontally pivotable between a closed position at which the cylinder and member are vertically aligned and an open position at which the member is swung outwardly with respect to the cylinder. A second vertical hollow tube has a first opening which communicates with the interior of the member at a point disposed above its inner surface. A third vertical hollow tube engaging the second tube has a second opening communicating with said inner surface. The third tube has an open lower end disposed adjacent the lower end of the second tube. The lower end of the third tube can be opened or closed manually.

5 Claims, 6 Drawing Sheets

APPLIANCE FOR BREWING BEVERAGES

BACKGROUND OF THE INVENTION

The present invention is directed generally toward known types of automatic drip type coffee appliances which are adapted to brew tea. Known appliances normally employ a reservoir for water, an electric heating element to heat the water, a chamber for holding coffee grounds and a container disposed below the chamber. The chamber contains a bottom opening and the heated water is caused to drip into the container. The heated water absorbs the essence of the grounds and drips downwardly into the container as brewed coffee. The design parameters of automatic drip type appliances are properly adjusted for this function. However, if tea leaves are substituted for the coffee grounds, it has been found that the design parameters used for brewing coffee are not appropriate for brewing tea. In particular tea, unlike coffee, must be steeped in heated water for an appropriate period for proper brewing.

U.S. Pat. No. 4,882,983 discloses an appliance of the automatic drip type wherein the design parameters are varied in such manner that tea can be steeped automatically to provide properly brewed tea. In this appliance, a container defines a chamber to receive coffee grounds, tea leaves, tea bags or the like and a receptacle for receiving brewed liquids. The container includes an outlet port disposed above the lowest portion of the chamber which is dimensioned to communicate with the receptacle. The container also includes a drain port disposed at the bottom of the chamber and means for opening and closing the drain port. In use, water is discharged into the chamber with the drain port closed. Enough water is discharged to cause the water level to reach the outlet port. Excess water is discharged directly into the receptacle via the outlet port. After the brewing cycle is completed, the drain port is opened and the brewed tea flows into the receptacle via the drain port.

In this appliance, the receptacle and chamber are separate individual units and the remaining structure which incorporates the reservoir and heating element is yet another unit.

The present invention is directed toward an improved type of appliance which can be used to brew tea wherein a chamber having the same function as in the patented appliance but modified in its geometry is permanently incorporated into a modified structure which contains the reservoir and heating element, thus forming a single common unit whereby only one additional unit, a separate receptacle, is required.

SUMMARY OF THE INVENTION

In accordance with the principles of the invention, an appliance for brewing coffee or tea comprises a vertical hollow cylinder having a closed lower end and an open upper end. The cylinder has a first vertical hollow tube on its periphery which extends upwardly to a selected position above the cylinder. The tube terminates at this position in a horizontal extension having a downwardly disposed discharge orifice. The cylinder contains a water reservoir communicating with the upper cylinder end. The cylinder is provided with means for heating any water in the reservoir and means to cause any water so heated to flow upwardly through the first tube and tube extension for discharge at the orifice.

A vertical hollow cylindrical member having the same diameter as the cylinder, has a closed lower end and an open end. The member upper end is disposed adjacent said selected position below the discharge orifice. The member lower end is adjacent but below the upper cylinder end. The member is peripherally secured to the first tube and is horizontally pivotable thereabout between a closed position at which the cylinder and member are vertically aligned and an open position at which the member is swung outwardly with respect to the cylinder. The lower member end has an inner surface which extends inclinedly downward toward the bottom of the vertical wall of the member.

A second vertical tube secured to the member periphery has a first opening which communicates with the interior of the member at a selected level above the inner surface and has an open lower end.

A third vertical tube secured to the member periphery and the second tube has a second opening communicating with the inner surface at the bottom of the vertical wall of the member and has an open lower end disposed adjacent the open lower end of the second tube adjacent the fourth opening in the second tube.

Additional means, manually operable, is provided for opening or closing the lower end of the third tube.

In use, a hollow container having a top opening is moved so that this top opening is in registration with the lower ends of the second and third tubes. The member is pivoted into an open position and tea leaves or coffee granules are placed into the member, the top level of such material being disposed below the first opening. The cylinder reservoir is filled with water. The lower end of the third tube is closed. The first member is placed in closed position. The water in the reservoir is heated and the heated water flows into the member to a level at least as high as the first opening. The first opening functions as an overflow port whereby excess water flows through the second tube into the container.

If tea leaves are in the member, the lower end of the third tube is held closed until the tea is steeped. When sufficient time has elapsed to steep the tea, the lower end of the third tube is opened and the steeped tea flows into the container.

When coffee is in the member, the same process is followed although the length of elapsed time prior to opening the closed end is reduced.

DETAILED DESCRIPTION OF PREFERRED EMBODIMENT

Figure 1:
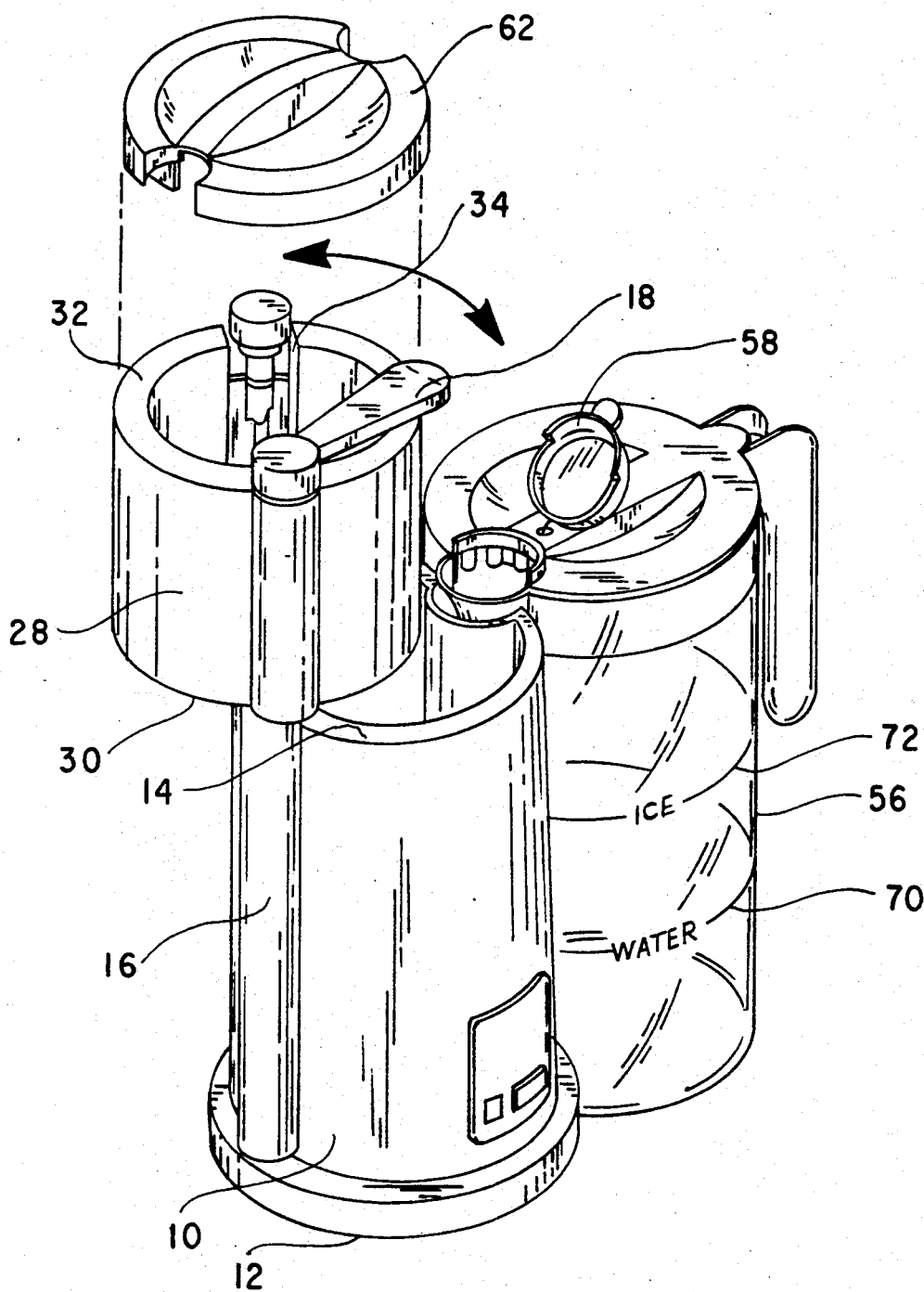
FIG. 1 is a front perspective view of the appliance which illustrates the pivotable arrangement of the cylinder and member.

Referring now to FIGS. 1-7, 1. an appliance for brewing coffee or tea comprises a vertical hollow cylinder 10 having a closed lower end 12 and an open upper end 14. The cylinder has on its periphery a first vertical hollow tube section 16 which is a part of a first composite first tube 16, 19. The composite first tube extends upwardly above the upper cylinder end and terminates in a hollow horizontal extension 18 having a downwardly disposed discharge orifice 20 overlying the open cylinder end. The cylinder contains a water reservoir 22 communicating with the upper cylinder end. The cylinder has conventional electrically powered heating elements 24 for heating/pumping any water in the reservoir and causing it to flow upwardly through tube 17 and the tube extension 18 for discharge at the orifice 20.

Figure 6:
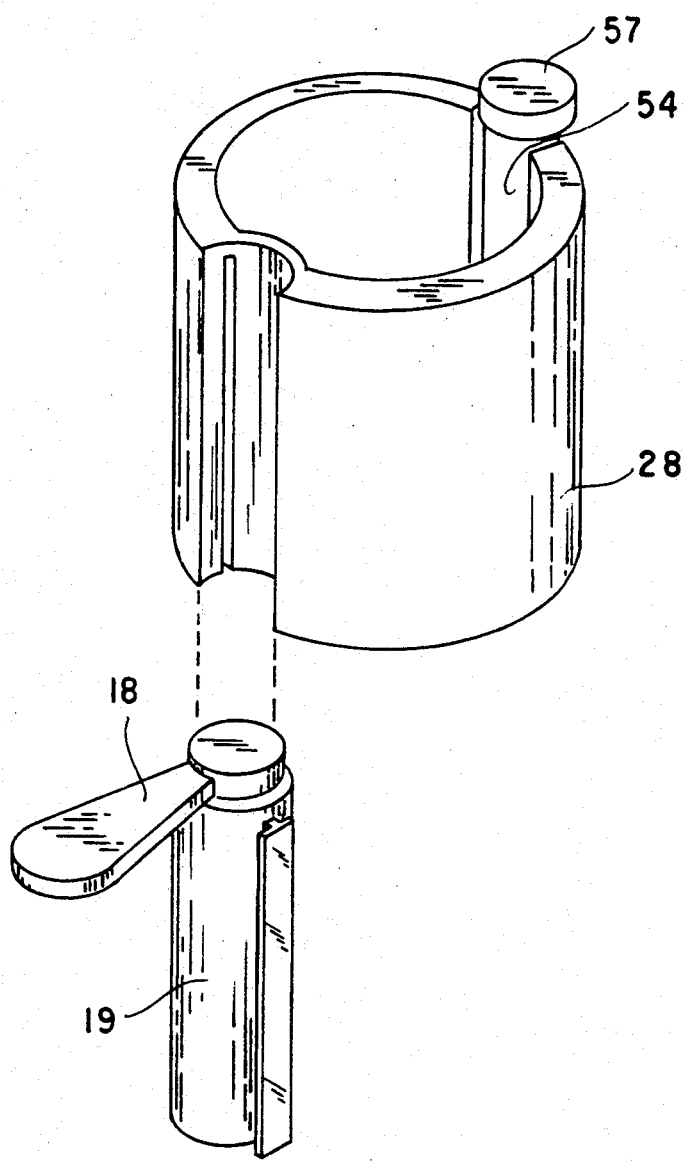
FIG. 6 is a detail view of the member and associated portion of the first tube shown in separated position.
Figure 7:
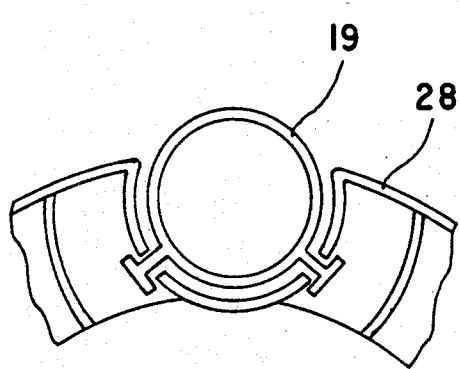
FIG. 7 is a bottom view of the member and associated portion of the first tube in assembled position.

A vertical hollow cylindrical member 28 has the same diameter as the cylinder. Member 28 has a closed lower end 30 and an open upper end 32. The member upper end is disposed adjacent but below the horizontal tube extension. The lower end of the member is adjacent but above the upper cylinder end. The member is peripherally secured to portion 19 of composite first tube 16, 19. Portion 19 has open top and bottom ends. Portion 19 is horizontally pivotable manually about section 16 of the composite first tube between a closed position at which the cylinder and member are vertically aligned and an open position at which the member is swung outwardly with respect to the cylinder and can be manually separated from section 19 as shown in FIG. 6. The member has a vertically elongated opening 34 spaced from the first tube. The lower member end has an inner surface 36 which extends inclinedly downward to engage the opening 34.

A second vertical hollow tube 38 is secured peripherally to the member 28 with a first opening 40 disposed at a selected height above the inner surface and communicating with the opening 34. Tube 38 has an open lower end 42.

A conduit functioning as a third hollow tube 44 is secured to the inside of tube 38 and extends downwardly there along. Tube 44 has an opening 46 concentric with opening 42 and communicating with the lower end of inclined surface 36. Tube 44 has an open lower end. A vertical shaft 48 having a plug 50 at its lower end extends through tube 44. A spring 52 biases the plug upwardly to close the lower end of tube 44. When button 57 is depressed, the plug is moved downward to open the lower end of tube 44. The button can be rotated to lock the plug in either position.

A container 56 has a spout 60. In use the spout is engaged with the lower aligned ends of tubes 44 and 38.

When the appliance is used to steep tea or to brew coffee the opening 46 of tube 44 serves as a drain port which can be opened or closed and opening 40 serves as an overflow port when the appliance is in use. Any overflow of fluid passes through the overflow port and downwardly through tube 38 for continual discharge into the container.

When cap 62 is placed over the tube extension 18, a recess in the interior surface of the cap engages the extension and prevents relative rotation of the member and the cylinder while at the same time the cap sealably engages the open upper end of the member.

In order to properly fill the reservoir with water, water is first poured into the container until it reaches water level 70 in the container. The water is then poured out of the container into the reservoir to fill it. When the appliance is to be used to yield ice tea, ice is then placed in the container until level 72 is reached. The tea after steeping or the hot coffee, is then emptied into the container and melts the ice to produce ice tea or coffee.

Figure 2:
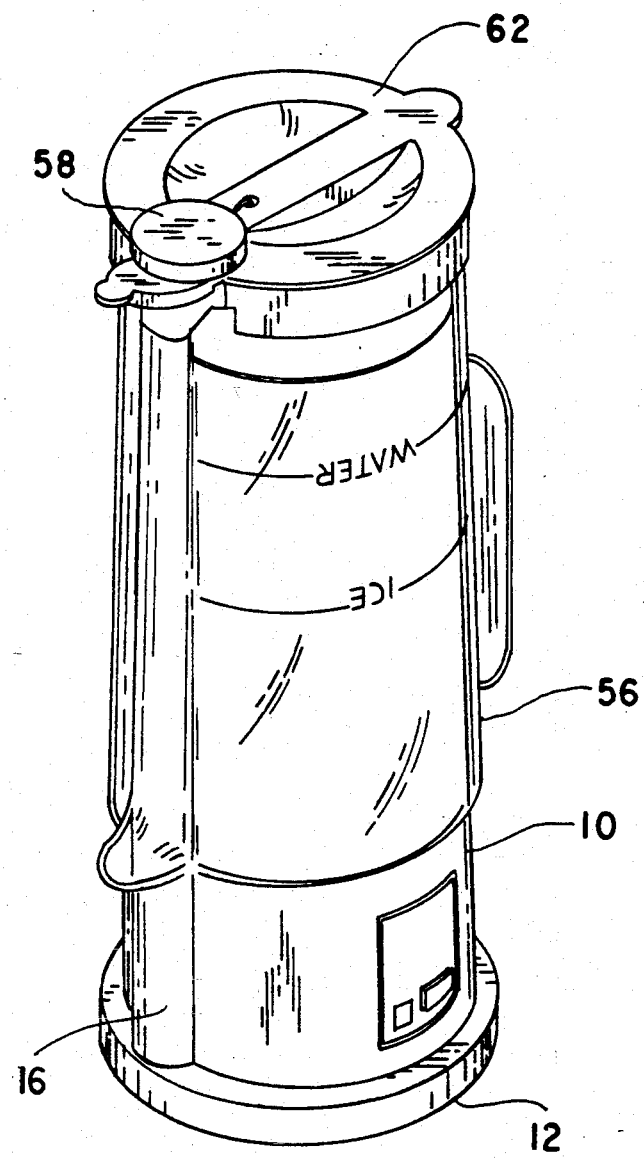
FIG. 2 is a perspective view of the appliance as shown in position for shipping and storage.
Figure 3:
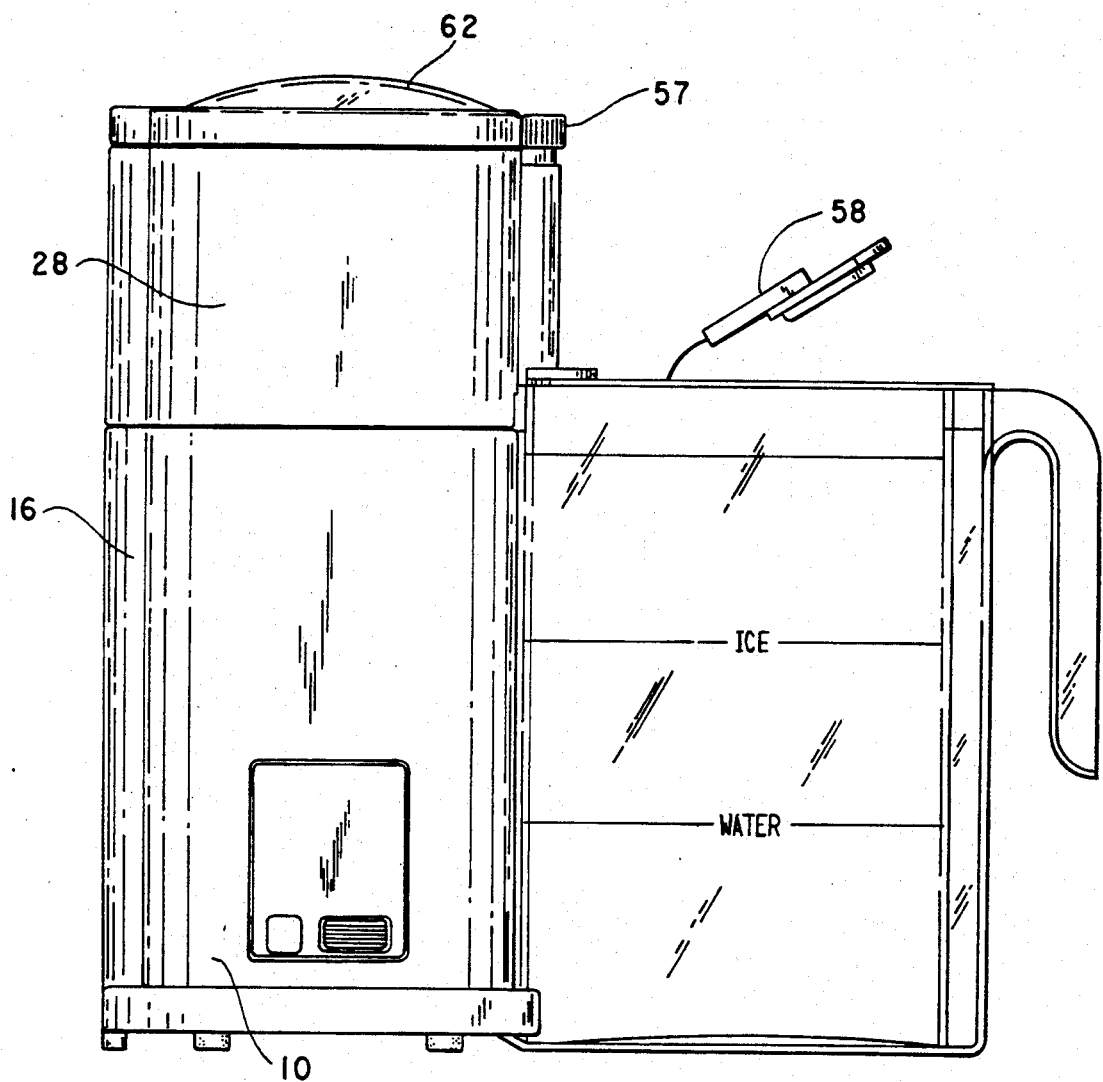
FIG. 3 is a side view showing the appliance immediately before use.
Figure 4:
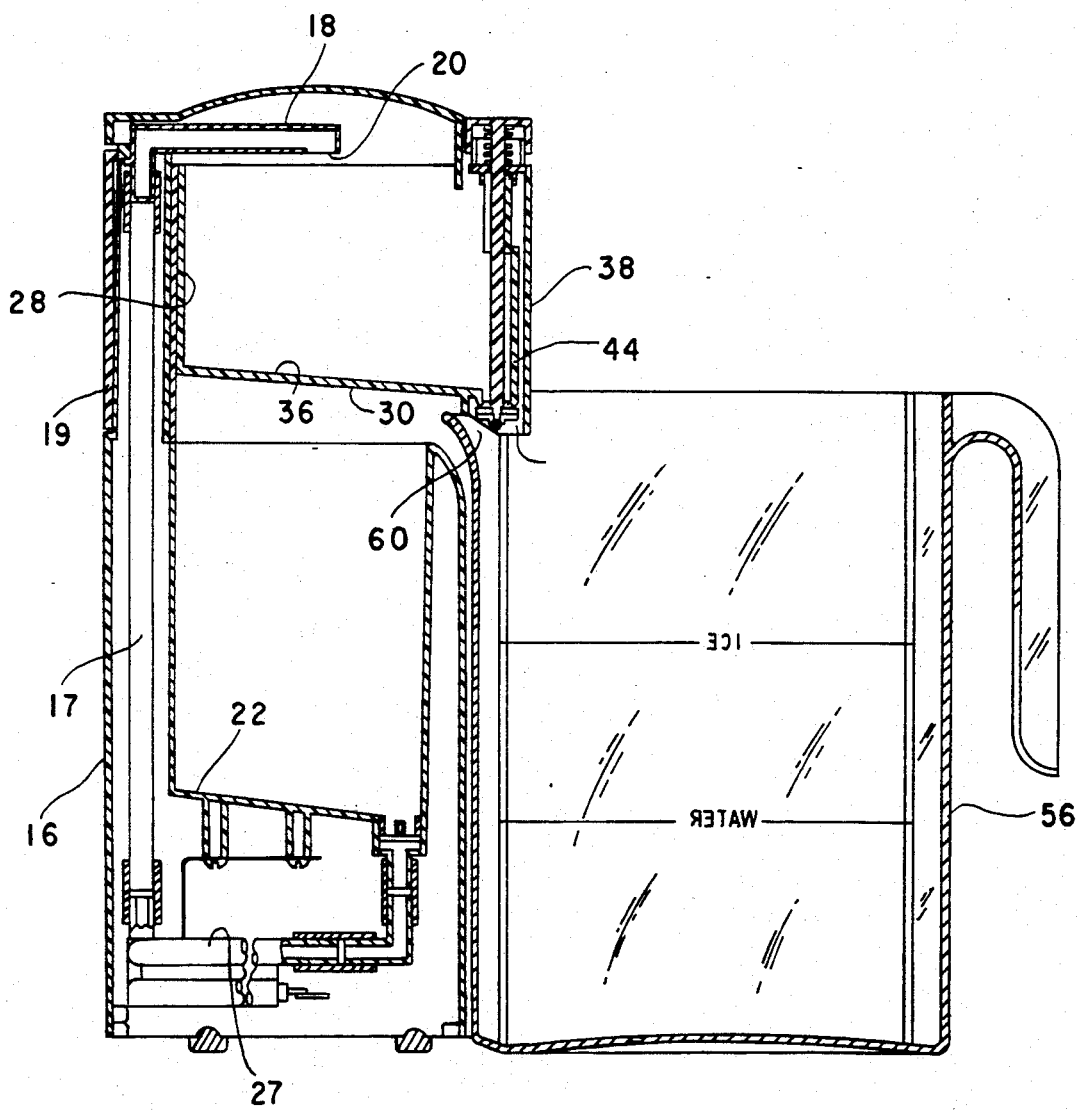
FIG. 4 is a vertical cross sectional view of the structure shown in FIG. 3.
Figure 5B:
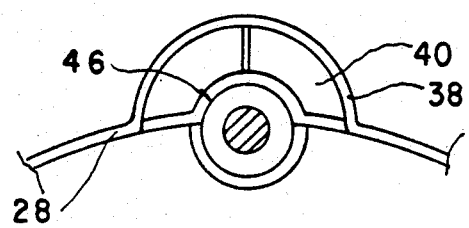
FIGS. 5a, 5b, and 5c are respectively front, top and bottom views of the second and third tubes and associated portions of the cylindrical member.
Figure 5A:
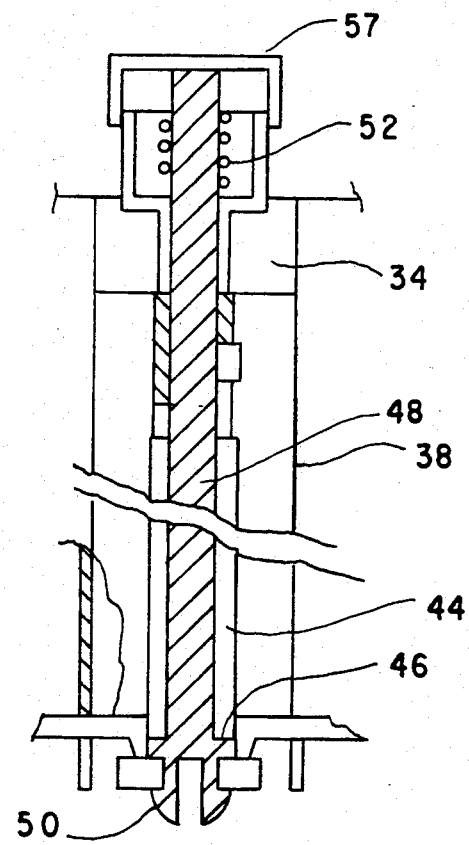
Figure 5C:
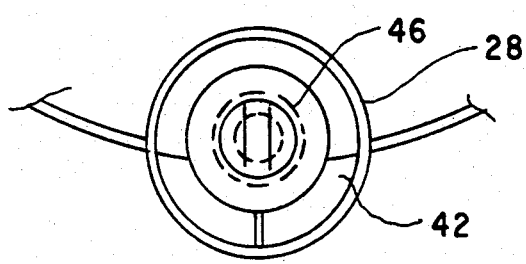

Cap 58 and cap 62 cooperate with the upper end of container 56 for use a shown in FIG. 1 and cooperate with the lower end of container 56 for shipment and storage as shown in FIG. 2.

What is claimed is:

1. An appliance for brewing coffee or tea, said appliance comprising:

a vertical hollow cylinder having a closed lower end and an open upper end, said cylinder having a first vertical non-rotatable hollow tube on its periphery which extends upwardly above the upper cylinder end and terminates in a hollow horizontal extension having a downwardly disposed discharge orifice overlying the open cylinder end, said cylinder containing a water reservoir communicating with the upper cylinder end, said cylinder having means for heating any water in the reservoir and means to cause any water so heated to flow upwardly through the first tube and tube extension for discharge at said orifice;

a vertical hollow cylindrical member having the same diameter as the cylinder, said member having a closed lower end and an open upper end, the member upper end being disposed adjacent but below the horizontal tube extension, the lower end being adjacent but above the upper cylinder end, said member being peripherally secured to the first tube and being horizontally pivotable thereabout between a closed position at which the cylinder and member are vertically aligned and an open position at which the member is swung outwardly with respect to the cylinder, the lower member end having an inner surface which extends inclinedly downward to an inner wall of the member;

a second vertical hollow tube having an open lower end and a first opening which communicates with the interior of the member at a selected position disposed above said inner surface;

a third vertical hollow tube engaging the second tube and having a second opening which communicates with said inner surface at said inner wall, the third tube having an open lower end disposed adjacent the lower end of the second tube; and means manually operable for opening and closing the lower end of the third tube.

2. The appliance of claim 1 further including a hollow container having an open spout engagable with the lower ends of the second and third tubes.

3. The appliance of claim 2 further including a cap detachably covering the extension and open upper end of the member.

4. The appliance of claim 3 wherein the manually operable means includes a vertical shaft extending through the third tube with a plug at the lower end of the shaft which is moved into and out of closure engagement with the lower end of the third tube.

5. The appliance of claim 4 wherein the member has a vertical slit communicating with the first and second openings and extending downward to the inclined surface.

* * * * *